United States Patent [19]
Kurumida

[11] Patent Number: 5,818,459
[45] Date of Patent: Oct. 6, 1998

[54] DATA CONVERSION APPARATUS AND METHOD USING CONTROL POINTS OF A CURVE

[75] Inventor: Tsuneaki Kurumida, Kawasaki, Japan

[73] Assignee: Canon Kabushiki Kaisha, Tokyo, Japan

[21] Appl. No.: 381,340

[22] Filed: Jan. 31, 1995

[30] Foreign Application Priority Data

Feb. 2, 1994 [JP] Japan .................................. 6-011024

[51] Int. Cl.$^6$ .................................................. G06T 11/00
[52] U.S. Cl. ............................................................ 345/442
[58] Field of Search .................................. 395/142, 143, 395/150, 151, 133, 167–172; 382/241, 242; 345/442, 443, 440, 441, 433

[56] References Cited

U.S. PATENT DOCUMENTS 5,422,990  6/1995  Siverbrook et al. .................... 395/142

OTHER PUBLICATIONS

F. Yamaguchi, "Shape Processing Technology By a Compter Display", published by Nikkan Industry Newspaper Co., Ltd.

Primary Examiner—Almis R. Jankus
Attorney, Agent, or Firm—Fitzpatrick, Cella, Harper & Scinto

[57] ABSTRACT

A curve conversion apparatus can automatically convert a cubic curve into a quadratic curve and automatically convert data for outline font that are constituted by cubic curves and straight lines into data for outline fonts that are constituted by quadratic curves and straight lines. According to this apparatus, control points of a cubic curve, such as a cubic Bezier curve or a cubic B spline curve, are employed to acquire control points of a quadratic curve, and the acquired control points are stored.

13 Claims, 14 Drawing Sheets

```
switch(nop)
{
  case 3:
    bzr->x = coord->x;
    bzr->y = coord->y;
    bzr++;
    bzr->x = coord->x;
    bzr->y = coord->y;
    bzr++;
    bzr->x = (coord->x + (coord+1)->x) >> 1;
    bzr->y = (coord->y + (coord+1)->y) >> 1;
    bzr++;
    bzr->x = (coord->x + ((coord+1)->x << 1) + (coord+2)->x) >> 2;
    bzr->y = (coord->y + ((coord+1)->y << 1) + (coord+2)->y) >> 2;
    bzr++;
    coord++;

bzr->x = (coord->x + (coord+1)->x) >> 1;
    bzr->y = (coord->y + (coord+1)->y) >> 1;
    bzr++;
    coord++;

bzr->x = coord->x;
    bzr->y = coord->y;
    bzr++;
    bzr->x = coord->x;
    bzr->y = coord->y;

return 7;
```

FIG. 11
```
        break;
    case 4:
        bzr->x = coord->x;
        bzr->y = coord->y;
        bzr++;
        coord++;
        bzr->x = coord->x;
        bzr->y = coord->y;
        bzr++;
        coord++;
        bzr->x = coord->x;
        bzr->y = coord->y;
        bzr++;
        coord++;
        bzr->x = coord->x;
        bzr->y = coord->y;

return 4;
        break;
    case 5:
        bzr->x = coord->x;
        bzr->y = coord->y;
        bzr++;
        coord++;
        bzr->x = coord->x;
        bzr->y = coord->y;
        bzr++;
        bzr->x = (coord->x + (coord+1)->x) >> 1;
        bzr->y = (coord->y + (coord+1)->y) >> 1;
```

FIG. 12
```
bzr++;
bzr->x = (coord->x + ((coord+1)->x << 1) + (coord+2)->x) >> 2;
bzr->y = (coord->y + ((coord+1)->y << 1) + (coord+2)->y) >> 2;
bzr++;
coord++;
bzr->x = (coord->x + (coord+1)->x) >> 1;
bzr->y = (coord->y + (coord+1)->y) >> 1;
bzr++;
coord++;
bzr->x = coord->x;
bzr->y = coord->y;
bzr++;
coord++;
bzr->x = coord->x;
bzr->y = coord->y;
return 7;
break;
case 6:
    bzr->x = coord->x;
    bzr->y = coord->y;
    bzr++;
    coord++;
    bzr->x = coord->x;
    bzr->y = coord->y;
    bzr++;
    bzr->x = (coord->x + (coord+1)->x) >> 1;
    bzr->y = (coord->y + (coord+1)->y) >> 1;
    bzr++;
    bzr->x = (3*(coord->x) + 7*((coord+1)->x) + ((coord+2)->x << 1))
```

FIG. 13

```
            /12;
bzr->y = (3*(coord->y) + 7*((coord+1)->y) + ((coord+2)->y << 1))
            /12;
bzr++;
coord++;
bzr->x = ((coord->x << 1) + (coord+1)->x) /3;
bzr->y = ((coord->y << 1) + (coord+1)->y) /3;
bzr++;
bzr->x = (coord->x + ((coord+1)->x << 1)) /3;
bzr->y = (coord->y + ((coord+1)->y << 1)) /3;
bzr++;
bzr->x = ((coord->x << 1) + 7*((coord+1)->x) + 3*((coord+2)->x))
            /12;
bzr->y = ((coord->y << 1) + 7*((coord+1)->y) + 3*((coord+2)->y))
            /12;
bzr++;
coord++;
bzr->x = (coord->x + (coord+1)->x) >> 1;
bzr->y = (coord->y + (coord+1)->y) >> 1;
bzr++;
coord++;
bzr->x = coord->x;
bzr->y = coord->y;
bzr++;
coord++;
bzr->x = coord->x;
bzr->y = coord->y;

return 10;
```

FIG. 14

```
        break;
default:
{
    short   n=nop-6;
    POS *current;
    current = coord;
    bzr->x = current->x;
    bzr->y = current->y;
    bzr++;
    current++;
    bzr->x = current->x;
    bzr->y = current->y;
    bzr++;
    bzr->x = (current->x + (current+1)->x) >> 1;
    bzr->y = (current->y + (current+1)->y) >> 1;
    bzr++;
    bzr->x = (3*current->x + 7*((current+1)->x) + ((current+2)->x << 1))
             /12;
    bzr->y = (3*current->y + 7*((current+1)->y) + ((current+2)->y << 1))
             /12;
    bzr++;
    current++;
    bzr->x = ((current->x << 1) + (current+1)->x) /3;
    bzr->y = ((current->y << 1) + (current+1)->y) /3;
    bzr++;
    bzr->x = (current->x + ((current+1)->x << 1)) /3;
    bzr->y = (current->y + ((current+1)->y << 1)) /3;
    bzr++;
    current++;
```

FIG. 15

```
while(n--)
{
    bzr->x = ((current-1)->x + (current->x << 2) + (current+1)->x)
            /6;
    bzr->y = ((current-1)->y + (current->y << 2) + (current+1)->y)
            /6;
    bzr++;
    bzr->x = ((current->x << 1) + (current+1)->x) /3;
    bzr->y = ((current->y << 1) + (current+1)->y) /3;
    bzr++;

bzr->x = (current->x + ((current+1)->x << 1)) /3;
    bzr->y = (current->y + ((current+1)->y << 1)) /3;
    bzr++;

current++;
}
current = &coord[nop - 2];
bzr->x =(((current-2)->x << 1) + 7*((current-1)->x) + 3*(current
        ->x))/12;
bzr->y =(((current-2)->y << 1) + 7*((current-1)->y) + 3*(current
        ->y))/12;
bzr++;
bzr->x =((current-1)->x + current->x) >> 1;
bzr->y =((current-1)->y + current->y) >> 1;
bzr++;
bzr->x =  current->x;
bzr->y =  current->y;
bzr++;
```

FIG. 16
```
        bzr->x = (current+1)->x;
        bzr->y = (current+1)->y;
        return ((nop-3)*3+1);
        break;
    }
}
```

DATA CONVERSION APPARATUS AND METHOD USING CONTROL POINTS OF A CURVE

BACKGROUND OF THE INVENTION

1. Field of the Invention

The present invention relates to a data conversion apparatus and method that can be applied to a display device that employs a quadratic curve or a cubic curve to represent figures, a CAD system, and an outline font processing system.

2. Related Background Art

Conventionally, an increase in the order of a curve has been easily performed in the processing for a curve that is employed to represent the outline of a figure. When the order is decreased, however, the control points for the curve are newly redetermined by human effort. Or, with no reference to a higher curve, a new lower curve is produced from a bit map of the figure.

Since the conventional example, however, involves human effort, the steps in the procedure as well as the conversion costs are increased. Further, when a lower curve is generated directly from a bit map for a figure, the results are not very accurate, and in the long run, human effort must be relied upon.

SUMMARY OF THE INVENTION

To overcome the above described shortcomings, it is an object of the present invention to provide a data conversion apparatus and its method that can automatically acquire control points for a lower curve directly from a higher curve.

It is another object of the present invention to provide a data conversion apparatus and its method that can automatically and accurately acquire control points for a lower curve from a higher curve.

It is an additional object of the present invention to provide a data conversion apparatus that comprises:

input means for receiving data for control points of a higher curve;

conversion means for converting the data for the control points that form the higher curve into data for control points of a lower curve; and output means for outputting the data acquired for the control points of the lower curve.

It is a further object of the present invention to provide a data conversion apparatus that comprises:

input means for receiving outline font data that consists of cubic curve data;

means for reading data for control points of the cubic curve data that establishes the outline font data that are received;

calculation means for acquiring data for control points of a quadratic curve from the data for the control points that are read out;

generation means for employing the data that are acquired for the control points to produce data for an outline font that uses quadratic curves; and data storage means for storing the outline font data that are produced.

It is still another object of the present invention to provide a data conversion method that comprises the steps of:

receiving data for control points of a higher curve;

converting the data for the control points that constitute the higher curve into data for control points of a lower curve; and outputting the data acquired for the control points of the lower curve.

It is a still further object of the present invention to provide a data conversion method that comprises the steps of:

receiving outline font data that are constituted by cubic curve data;

reading data for control points of the cubic curve data that form the outline font data that are received;

calculating data for control points of a quadratic curve from the data, for the control points, that are read out;

producing data for outline font that uses quadratic curves by employing the data for the control points that are acquired; and storing the outline font data that are produced.

BRIEF DESCRIPTION OF THE DRAWINGS

FIG. 10 is a program for the conversion from a B spline curve to a Bezier curve;

FIG. 11 is a program for the conversion from a B spline curve to a Bezier curve;

FIG. 12 is a program for the conversion from a B spline curve to a Bezier curve;

FIG. 13 is a program for the conversion from a B spline curve to a Bezier curve;

FIG. 14 is a program for the conversion from a B spline curve to a Bezier curve;

FIG. 15 is a program for the conversion from a B spline curve to a Bezier curve;

FIG. 16 is a program for the conversion from a B spline curve to a Bezier curve.

DETAILED DESCRIPTION OF THE PREFERRED EMBODIMENTS

[Embodiment 1]

Figure 1:
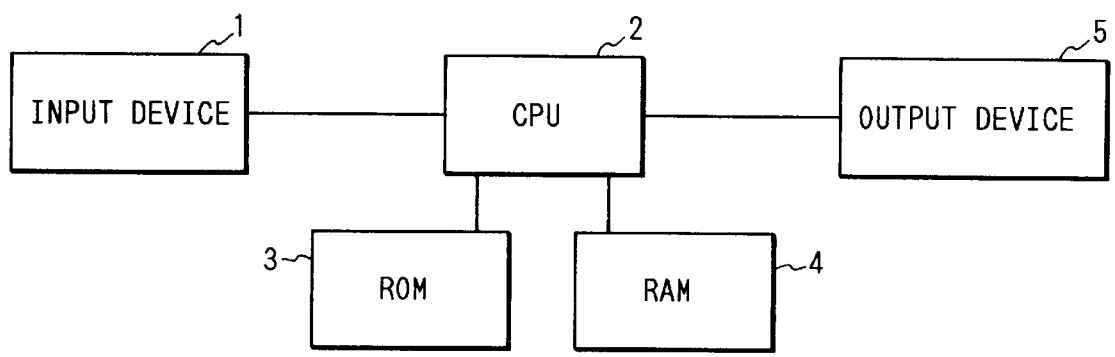
FIG. 1 is a block diagram illustrating an apparatus according to Embodiment 1 of the present invention.

FIG. 1 is a diagram that represents the feature of the present invention most precisely. In FIG. 1, an input device 1 receives a cubic Bezier curve that is stored in advance in a storage device, such as an FDD (floppy disk drive) or an HDD (hard disk drive) (neither or them shown). A CPU 2 controls the entire apparatus and performs the calculations. A ROM (Read Only Memory) 3 is employed to store the control procedures and the calculation procedures for this apparatus. A RAM 4 (Random Access Memory) 4 is employed as a temporary storage area during the control process or the calculation process. An output device 5 outputs a quadratic B spline curve, which is obtained after the completion of the conversion by this apparatus, to a display device or a printer (neither of them shown), or to a storage device, such as an FDD or an HDD. This embodiment may be combined with software or hardware at a work station.

Figure 2:
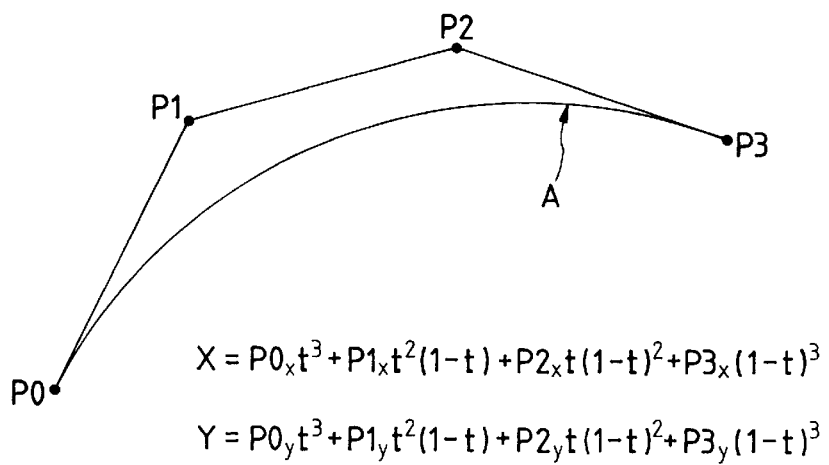
FIG. 2 is a diagram showing a cubic Bezier curve.

In FIG. 2 are shown a cubic Bezier curve, which is an input data form of the apparatus according to the present invention, and its expressions. A Bezier curve is represented that is defined by four points, P0, P1, P2, and P3. When these four points are located as is shown in FIG. 4, the locus of the Bezier curve is as indicated by A.

Figure 3A:
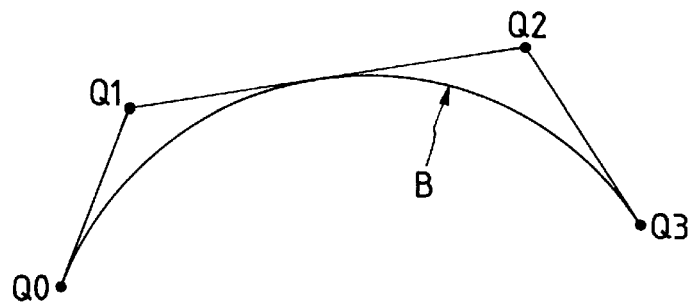
FIGS. 3A to 3C are diagrams showing a quadratic B spline curve.
Figure 3B:
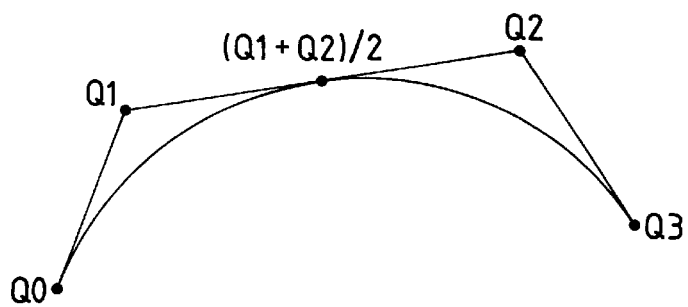
Figure 3C:
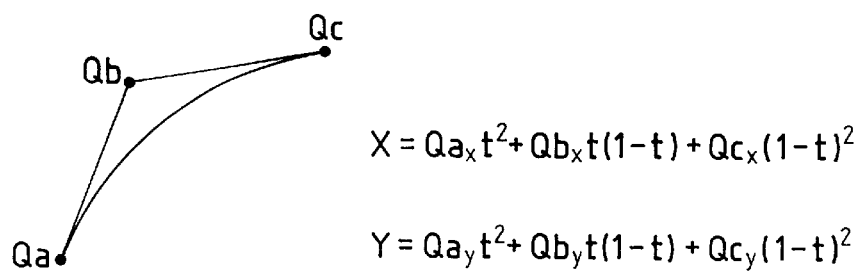

In FIGS. 3A through 3C is shown a quadratic B spline curve, which is an output data form of the apparatus of the present invention. In FIG. 3A is shown a quadratic B spline curve that is defined by four points Q0, Q1, Q2, and Q3. When these four points are positioned as is shown in FIG. 3A, the locus of the quadratic B spline curve is as indicated by B. In FIG. 3B, the quadratic B spline curve that is defined by the points Q0, Q1, Q2 and Q3 is divided into quadratic Bezier curves. As is apparent from FIG. 3B, the quadratic B spline curve can be divided into two quadratic Bezier curves, Q0–Q1–(Q1+Q2)/2, and (Q1+Q2)/2–Q2–Q3. In the same manner, for a quadratic B spline curve that is defined by Q0, Q1, . . . Wi, the curve Q1 to Wi-1 that excludes both ends Q1 and Wi can be divided into quadratic Bezier curves at the middle point of the adjacent two points. In FIG. 3C, a quadratic Bezier curve that is defined by Qa, Qb, and Qc and its expressions are shown.

In general, a lower curve can be represented by a higher curve, but the reverse is not possible. To decrease the order of the curve, therefore, it is necessary to approximate a higher curve by employing one or more lower curves.

A Bezier curve has the following characteristics.

(1) A Bezier curve is defined by two end points and an intermediate point. A quadratic Bezier curve has one intermediate point, while a cubic Bezier curve has two intermediate points.

(2) A straight line that extends from the end points to the adjacent intermediate points corresponds to a tangent at the end points.

(3) It is possible to divide a Bezier curve into a plurality of Bezier curves. This division can be done by only easy geometric calculation if it follows a specific rule. In other words, a Bezier curve can be recursively defined as an assembly of Bezier curves.

Figure 4A:
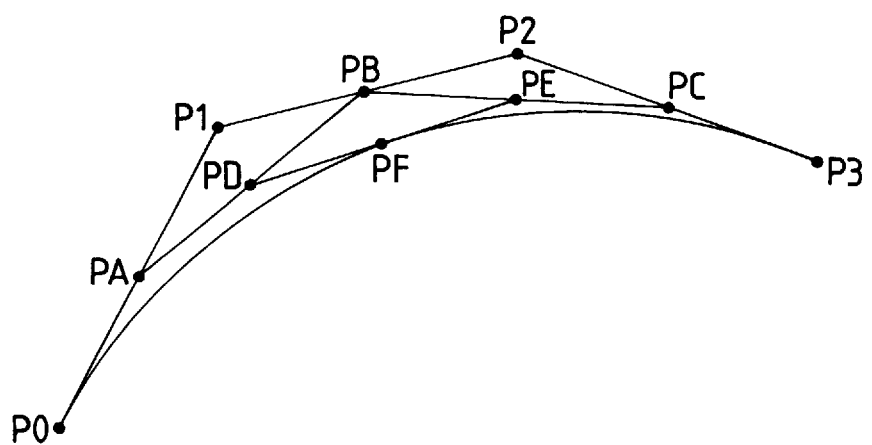
FIGS. 4A and 4B are diagrams showing the division of the Bezier curve.
Figure 4B:
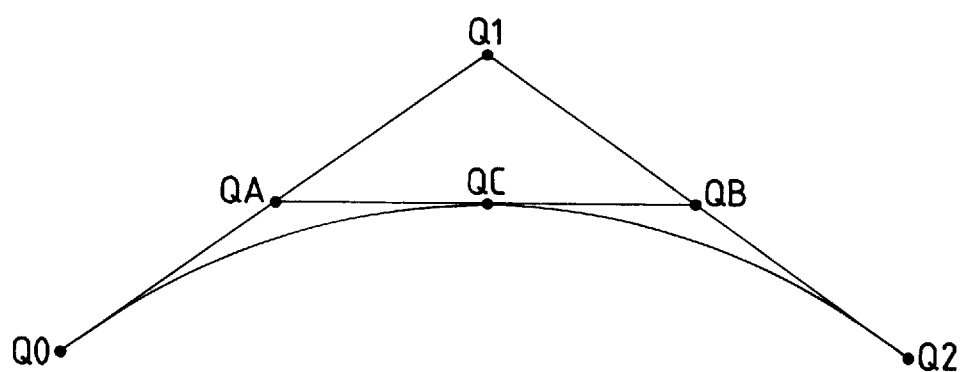

In FIGS. 4A and 4B, characteristic (3) of a Bezier curve is depicted. In FIG. 4A, the division of a cubic Bezier curve is represented. With PA as a middle point of P0 and P1, PB as a middle point of P1 and P2, PC as a middle point of P2 and P3, PD as a middle point of PA and PB, PE as a middle point of PB and PC, and PF as a middle point of PD and PE, a cubic Bezier curve that is defined by four points P0, P1, P2, and P3 can be divided into a cubic Bezier curve that has P1 and PF as its end points and PA and PD as its intermediate points, and a cubic Bezier curve that has PF and P3 as end points and PE and PC as intermediate points. In FIG. 4B, the division of a quadratic Bezier curve is represented. With QD as a middle point of QA and QB, QE as a middle point of QB and QC, and QF as a middle point of QD and QE, a quadratic Bezier curve that is defined by three points QA, QB, and QC can be divided into a quadratic Bezier curve, which has QA and QF as its end points and QD as its intermediate point, and a quadratic Bezier curve, which has QF and QC as its end points and QE as an intermediate point.

A cubic Bezier curve that is equivalent to a quadratic Bezier curve will be discussed. A quadratic Bezier curve can be represented by the expression in FIG. 3C, as is described above. When this expression is developed into a polynomial expression of t, the locus of a quadratic Bezier curve B is represented as:

$$B = (QA - 2QB + QC)t^2 + 2(QB - QC)t + QC.$$

A cubic Bezier curve A can be represented by the expression in FIG. 2, as is described above. When this expression is developed into a polynomial expression of t, $$A = (P0 - 3P1 + 3P2 - P3)t^3 + 3(P1 - 2P2 + P3)t^2 + 3(P2 - P3)t + P3.$$

When the expression for curve A is compared with the expression for curve B, $$P0 - 3P1 + 3P2 - P3 = 0$$

$$3(P1 - 2P2 + P3) = QA - 2QB + QC$$

$$3(P2 - P3) = 2(QB - QC)$$

$$P3 = QC.$$

Therefore, $$P0 = QA$$

$$P1 = (QC + 2QB)/3$$

$$P2 = (QA + 2QB)/3$$

$$P3 = QC$$

More specifically, both end points correspond to each other. Point P1 divides internally a line segment from QC to QB at a ratio of 2:1, and point P2 divides internally a line segment from QA to QB at a ratio of 2:1. When an intersection of lines P0P1 and P2P3 is Pα, and when PαP1:P1P0=1:2 and PαP2:P2P3=1:2, a cubic Bezier curve that is defined by P0, P1, P2, and P3 can be replaced with a quadratic Bezier curve. The shape that meets this requirement is a trapezium in the ratio of P1P2:P0P3=1:3. . . . <requirement 1>

Figure 5A:
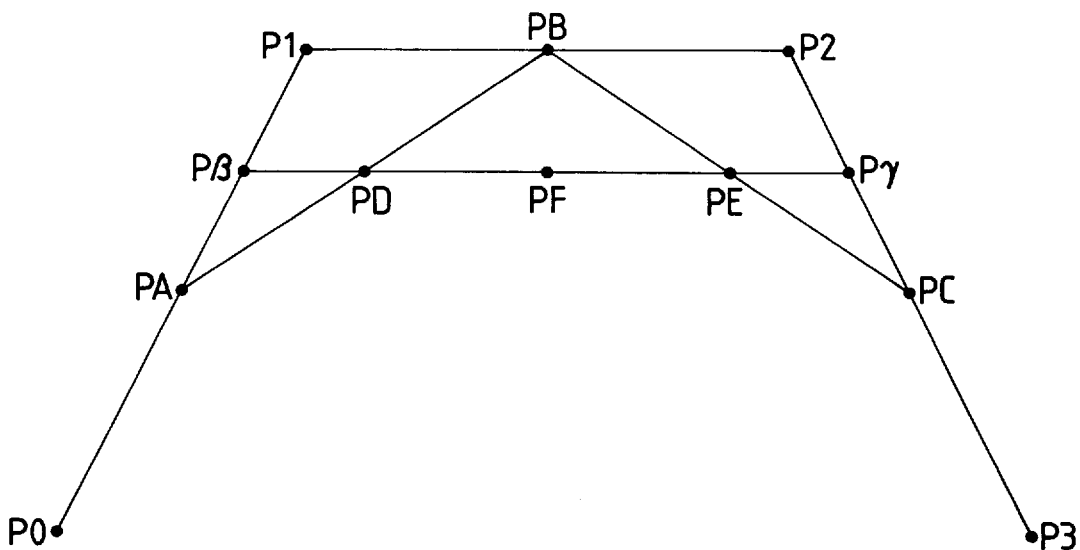
FIGS. 5A and 5B are diagrams showing a method for approximating a curve.

Next, the approximation of a curve will be considered. In FIG. 5A, a cubic Bezier curve is represented. Since P0P1=P2P3, a quadrilateral that is formed by linking control points is an isosceles trapezoid. Since PA through PF are already shown in FIG. 4, they are omitted here. Pβ is an intersection of lines PDPE and P0P1, and Pγ is an intersection of lines PDPE and P2P3. Since a quadrilateral P0P1P2P3 is an isosceles trapezoid, the lines P1P2, PβPγ, and P0P3 are parallel. As PD is a middle point of PA and PB and P1PB and PβPD are parallel to each other, Pβ is a middle point of PA and P1. As PA is a middle point of P0 and P1, Pβ internally divides line segment P0P1 at a ratio of 3:1. Likewise, Pγ divides internally line segment P3P2 at a ratio of 3:1. PF is a middle point of line segment PβPγ.

More specifically, in a cubic Bezier curve, a tangent at point P0 is line P0P1, a tangent at point P3 is line P3P2, and a tangent at point PF, which is a middle point of line segment PDPE, i.e., a middle point of PβPγ, according to the division rule of a cubic Bezier curve, is line PβPγ.

When Pβ and Pγ serve as intermediate points of a quadratic B spline curve, and P0 and P3 serve as end points of a quadratic B spline curve, line P0P1 is a tangent at P0 of a quadratic B spline curve, P3P2 is a tangent at P3, and PβPγ is a tangent at PF, which is a middle point of line segment PβPγ according to the division rule of a quadratic B spline curve.

As a result, a cubic Bezier curve and a quadratic B spline curve correspond to a highly accurate degree in the vicinities of P0, PF, and P3.... <solution 1>

Figure 5B:
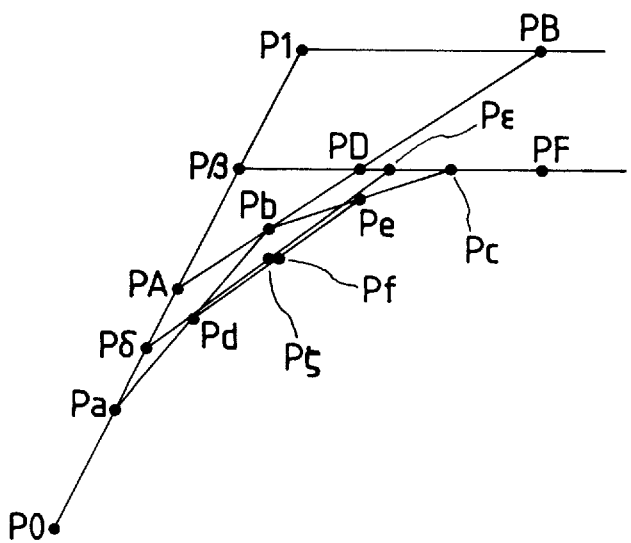

A distance between points P0 and PF in a curve will be considered. As is shown in FIG. 5B, a cubic Bezier curve is divided again. A middle point of P0 and PA is Pa, a middle point of PA and PD is Pb, a middle point of PD and PF is Pc, a middle point of Pa and Pb is Pd, a middle point of Pb and Pc is Pe, and a middle point of Pd and Pe is Pf. Further, re-division of a quadratic Bezier curve is also performed. A middle point of P0 and Pβ is Pδ, a middle point of Pβ and PF is Pε, and a middle point of Pδ and Pε is Pζ. When a straight line is drawn from PA in parallel to P1PB and its intersection of line PBPF is PX, PF is a middle point of PBPX. That is, P1PB and PβPD are parallel to each other, and PDPF and PAPX are also parallel. Therefore, triangle PAPβPD is similar to triangle PAP1PB at a ratio of 1:2, while triangle PBPDPF is similar to triangle PBPAPX at a ratio of 1:2. Thus, PβPD:PDPF=P1PB:PAPX=P1P2:PAPC= P1P2:(P1P2+P0P3)/2. When PβPD:PDPF=1:2, PDPε:PεPF=1:3. PAPδ:PδP0 is always 1:3. As a result, when PβPD:PDPF=P1P2:(P1P2+P0P3)/2=1:2, i.e., when P1P2:P0P3=1:3, Pf matches Pζ. An isosceles trapezoid with a ratio of P1P2:P0P3=1:3 is nothing but the previously described cubic Bezier curve with a ratio of PαP1:P1P0=1:2 and PαP2:P2P3=1:2. With even further division, a cubic Bezier curve fully corresponds to a quadratic Bezier curve.

As for a quadrilateral that is not an isosceles trapezoid, it has been so described that, if it is a trapezoid in consonance with requirement 1 and P1P2:P0P3=1:3, a quadratic Bezier curve, which mathematically corresponds to a cubic Bezier curve, can be acquired. As is apparent from the properties of curves, when the ratio is smaller than 1:3, a quadratic Bezier curve is positioned outside a cubic Bezier curve. When the ratio is greater than 1:3, a quadratic Bezier curve is positioned inside a cubic Bezier curve.

It is also apparent that, the nearer a trapezium is to being a trapezoid, the easier it is for the quadrilateral to possess the above described property. In the case of a quadrilateral that is close to being a trapezoid, from the above observations, a proper position for an intermediate point of a quadratic curve should be considered. Taking into account the matching of curves in the vicinities of P0, P3, and PF, as is described in solution 1, an intermediate point that is adjacent to P0 of a quadratic B spline curve must be positioned along line P0P1. An intermediate point that is adjacent to P3 must be positioned along line P2P3. This is apparent from the property in characteristic (3) of a Bezier curve. Further, to match the curves in the vicinity of PF, an intermediate point must be located along line PDPE. Therefore, when lines P0P1 and PDPE intersect each other near a point that divides line segment P0P1 at a ratio of 3:1, and likewise, lines P2P3 and PDPE intersect near the point that divides line segment P3P2 at a ratio of 3:1, the curves in the vicinities of P0, P3, and PF match each other fairly accurately as in the case of the isosceles trapezoid.... <requirement 2>

Next, the case where an angle formed by lines P0P1 and P2P3 is close to 180 degrees will be considered. In this case, either a cubic Bezier curve, or a quadratic Bezier curve, is almost straight, and in fact, there is only a slight evident difference between the two curves.... <requirement 3>

In addition, as is described in characteristic (3) of a Bezier curve, a Bezier curve can be divided. It is easily understood from characteristic (2) of a Bezier curve that by dividing the curve an angle approaching 180 degrees will be obtained. Therefore, when a cubic Bezier curve is divided, a quadratic Bezier curve or a quadratic B spline curve, which approximates the cubic curve, can be acquired.... <requirement 4>

From requirements 2, 3 and 4, the following statements can be made.

(A) When a cubic Bezier curve is to be approximated by a quadratic B spline curve, place an intermediate point of the quadratic B spline curve at an intersection of lines P0P1 and PDPE and at an intersection of lines P2P3 and PDPE.

(B) When an intersection can not be acquired in (A), or when a cubic Bezier curve differs greatly from a quadratic B spline curve, a cubic Bezier curve is divided and the process described in of (A) is performed.

(C) When a quadratic B spline curve has approached a cubic Bezier curve to a required degree of accuracy, the division is terminated.

Considering the case where a curve is represented on a display, as long as the difference in the loci of the two curves is smaller than a single pixel of a display, even though the curves do not match exactly from the mathematical view, no problem will occur. Actually, a degree of accuracy that is so high that it is defined by a single pixel is not required in many cases, and even a rough approximation does not really cause trouble. In fact, there are many systems that can obtain the required accuracy by performing the division once or twice.

Figure 6:
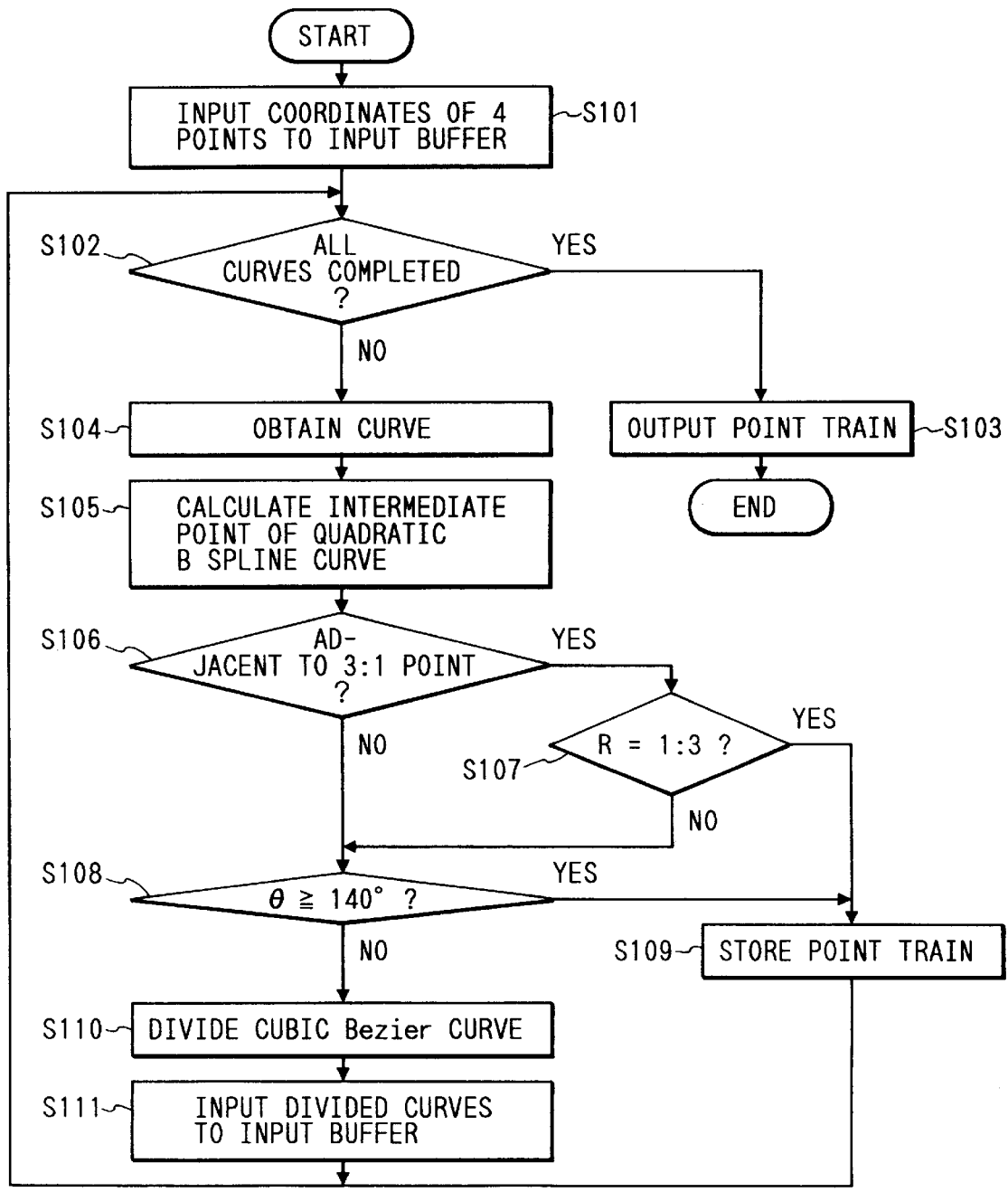
FIG. 6 is a flowchart for approximating a curve.

With the above described presumption, a flowchart for converting a curve is shown in FIG. 6. A program for this flowchart is stored in the ROM 3, and the CPU 2 executes the process. The CPU 2 uses the RAM 43 as a temporary storage area, which is required for the operation of the program.

At step S101, four points that are to be converted are input from the input device 1 to an input buffer, which exists as a temporary storage area in the RAM 4. The input order for these four points is the coordinates for the first end point, the coordinates for an intermediate point that is adjacent to the first end point, the coordinates for the next intermediate point, and the coordinates for the second end point. A curve that is defined by a set of the four points, i.e., by the end point, the first intermediate point, the second intermediate point, and the end point, is processed. At step S102, a check is performed to determine whether or not the process for all the curves has been completed. If the process has been completed, program control advances to step S103. If the process has not yet been completed, program control moves to step S104. At step S103, the coordinate train of a quadratic B spline curve that is acquired by conversion is extracted from an output buffer, and is output to the output device 5. The process is thereafter terminated. At step S104, data for a curve is extracted from the input buffer. At step S105, an intermediate point for a quadratic B spline curve is calculated by employing the coordinates of the four points that define the curve. The calculation of the intermediate point is as described in (A). At step S106, a check is performed to determine whether or not the coordinates of the intermediate point of the B spline curve exists in the vicinity of a point that internally divides a line segment that links both end points and the intermediate points adjacent to the end points at a ratio of 3:1. When the coordinates of the intermediate points are present, program control moves to step S107. When the coordinates of the intermediate points are not present, program control goes to step S108. The requirement that it be determined concerning whether the point is present in the vicinity can also be satisfied by a user entry that is in consonance with the accuracy and the size of a curve to be converted. In this embodiment, a distance of ±10% or less of the lengths of the individual line segments is regarded as being within the vicinity. At step S107, a check is performed to determine whether or not a length ratio R of a line segment that runs across two intermediate points to a line segment that runs across both end points is close to 1:3. If the ratio R is close to 1:3, program control moves to step S109. If the ratio R is not close to 1:3, program control advances to step S108. The requirement that it be determined concerning whether the ratio R is close to 1:3 can also be satisfied by a user entry that is in consonance with the accuracy and the size of a curve to be converted. In this embodiment, if the ratio R is 1:2.5 to 1:3.5 (it may vary in consonance with the required accuracy), it is regarded as being close to 1:3. At step S108, a check is performed to determine whether or not an angle θ, which is formed by a line that links the first end point and its adjacent intermediate point and a line that links the second end point and its adjacent intermediate point, is equal to or greater than 140 degrees. When the angle θ is equal to or greater than 140 degrees, program control advances to step S109. When the angle θ is smaller than 140 degrees, program control advances to step S110. The angle can be set also by a user in consonance with the accuracy and the size of a curve. Among the determination processes at steps S106, S107, and S108, it is possible to selectively perform either one or two, or all the processes. At step S109, the first end point, the acquired intermediate point of a quadratic B spline curve that is adjacent to the first end point, the acquired intermediate point of a quadratic B spline curve that is adjacent to the second end point, and the second end point are stored in the output buffer in the named order. The output buffer serves as a temporary storage area in the RAM 4. If there is a previously processed curve remaining, the first end point in this process and the previously acquired second end point of the curve are overlapped, and one of them is deleted. At step S110, it is assumed that a cubic Bezier curve does not match a quadratic B spline curve, and the cubic Bezier curve is divided into two. At step S111, the curve before the division was performed is deleted from the input buffer. While the order of the curves is maintained, the coordinates for the two curves are inserted at a predetermined location in the input buffer.

As is described above, in the apparatus that converts a cubic Bezier curve into a quadratic B spline curve, the coordinate values of a quadratic B spline curve are calculated by employing the coordinates of the control points of a cubic Bezier curve, so that the conversion of a curve can be performed at high speed and at an optional accuracy.

[Embodiment 2]

Figure 7:
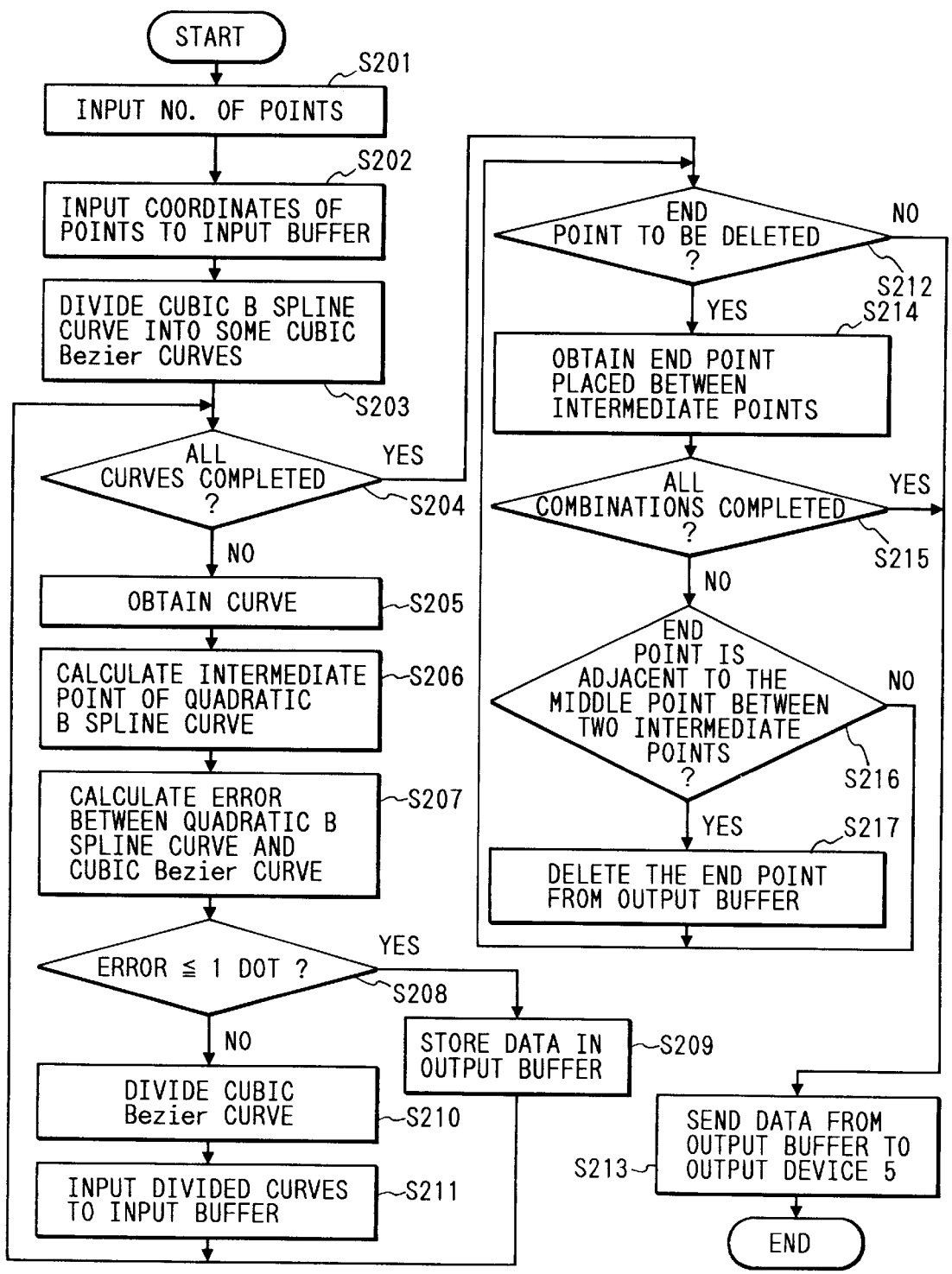
FIG. 7 is a flowchart for Embodiment 2.

FIG. 7 is a flowchart for operation procedures of the present invention. These procedures are performed by an apparatus arranged as is shown in FIG. 1 in Embodiment 1.

In FIG. 7, at step S201, the input of the required number of coordinate points is performed. At step S202, the coordinates for a first end point of a cubic B spline curve, the succeeding one or more intermediate points, and the second end point, which is the last, are input in the named order. At step S203, the point row of the cubic B spline curve is divided into a plurality of a cubic Bezier curves, which are then stored in the input buffer. A method for calculating a cubic Bezier curve from the point row of a cubic B spline curve will be described later. At step S204, a check is performed to determine whether or not all the curves have been processed. If all the curves have been processed, program control moves to step S212. If all the curves have not yet been processed, program control moves to step S205. At step S205, one curve is extracted. A single curve is defined by the set of four points, as in the first embodiment: the first end point, an intermediate point adjacent to the first end point, an intermediate point adjacent to the second end point, and the second end point. At step S206, as well as at step S105 in the above embodiment, the intermediate points of a quadratic B spline curve are calculated. At step S207, a difference between the acquired quadratic B spline curve and a cubic Bezier curve is calculated. The calculation of the difference is not required to be performed for all curves. Sampling may be performed on several to several tens of points on the quadratic B spline curve, so that a difference from a cubic Bezier curve at each of these points is calculated. In this embodiment, a quadratic B spline curve is divided into quadratic Bezier curves, and 16 end points, when the quadratic Bezier curves are recursively divided, are calculated. The calculation of a difference is performed by comparing these points with a cubic Bezier curve. At step S208, a check is performed to determine whether a difference at each point for which sampling was performed is equal to or less than one dot. If the difference is one dot or less, program control moves to step S209. If the difference is greater than one dot, program control goes to step S210. Although the determination is made by whether the difference is one dot or less, this value can be changed in consonance with the required accuracy. Further, instead of the determination of a difference, the method explained at steps S106, S107, and S108 in FIG. 6 may be employed. At step S209, the acquired points of the quadratic B spline curve are stored in the output buffer. The storage order is the first end point, the intermediate point of the quadratic B spline curve that is adjacent to the first end point, the intermediate point of the quadratic B spline curve that is adjacent to the second end point, and the second end point. At step S210, a cubic Bezier curve is divided. At step S211, the curve before the division is performed is deleted from the input buffer, the coordinates of the two curves are inserted into the input buffer at predetermined positions, while the order of the curves is maintained. When, at step S212, a user selects the deletion of the end points, the program control advances to step S214 in accordance with a selection command. When a user does not select the deletion, program control moves to step S214, as in Embodiment 1. At step S214, a search is performed in the output buffer for a portion that consists of a combination of an intermediate point, an end point, and an intermediate point of a quadratic B spline curve. At step S215, a check is performed to determine whether or not all such combinations have been processed. When all the combinations have been processed, program control goes to step S213. When all the combinations have not yet been processed, program control advances to step S216. At step S213, the contents of the output buffer are output to the output device 5 and the process is thereafter terminated. At step S216, a check is performed to determine whether or not the coordinates of the end point are adjacent to the middle point of the two intermediate points. If the end point is adjacent to the middle point, program control advances to step S217. If the end point is not so adjacent, program control returns to step S212 where the process for the next point row is begun. The requirements for determining when the end point is regarded as being adjacent to the middle point can be varied in consonance with the required accuracy and the size of a curve to be converted. In this embodiment, when the end point is located ±10% or less of a distance between two intermediate points in the direction that is parallel to the line that links the two intermediate lines, and is located ±1 dot or less in the direction that is perpendicular to the line that links the two intermediate points, the end point is regarded as being adjacent. At step S217, the end point that is to be processed is deleted from the output buffer, and program control returns to step S212 to perform the process for the next point row.

The conversion of a cubic B spline curve into a cubic Bezier curve is performed by the expression below.

It should be noted that this conversion method is well known and described in "Shape processing technology by a computer display [11]", by Fujio Yamaguchi, published by Nikkan Industry Newspaper Co., Ltd.

The program lists for performing this conversion method are shown in FIGS. 10 through 16. The entry bzr denotes a cubic Bezier curve to be output, the entry coord denotes a cubic B spline curve before conversion, the entry return denotes the return of the number of control points for a Bezier curve. The entry nop denotes the number of control points of a cubic B spline curve. C language is used for the description.

As is described above, in the apparatus that converts a cubic B spline curve into a quadratic B spline curve, the coordinates of the control points of the cubic B spline curve are employed to calculate the coordinate values of a quadratic B spline curve, so that the conversion of a curve can be efficiently performed at high speed and at an optional accuracy.

[Embodiment 3]

Figure 8:
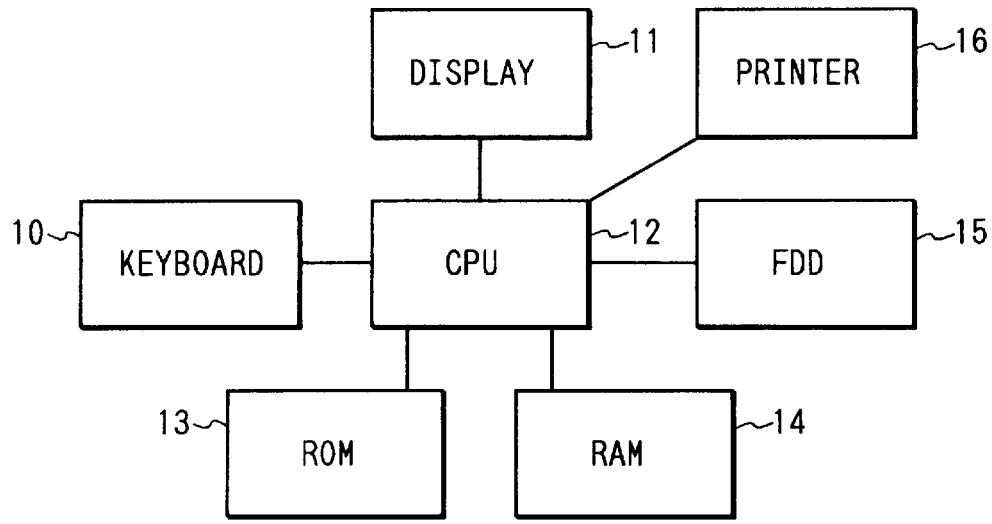
FIG. 8 is a block diagram illustrating an apparatus according to Embodiment 3 of the present invention.

FIG. 8 is a diagram illustrating an apparatus that converts outline font data, which consist of a cubic B spline curve and a straight line, and outline font data, which consists of a quadratic B spline curve and a straight line. A keyboard 10 is employed to edit a produced font; a CRT 11, a display device, displays an original font and the produced font; a CPU 12 performs calculations and provides control; a ROM 13 is employed to store font data and programs for control procedures and calculation procedures; and a RAM 14 is employed as a temporary storage area for calculation or control work. Reference number 15 denotes a floppy disk drive, and 16, a printer that provides a print output. The individual devices communicate with each other via a controller IC and a driver IC.

Figure 9:
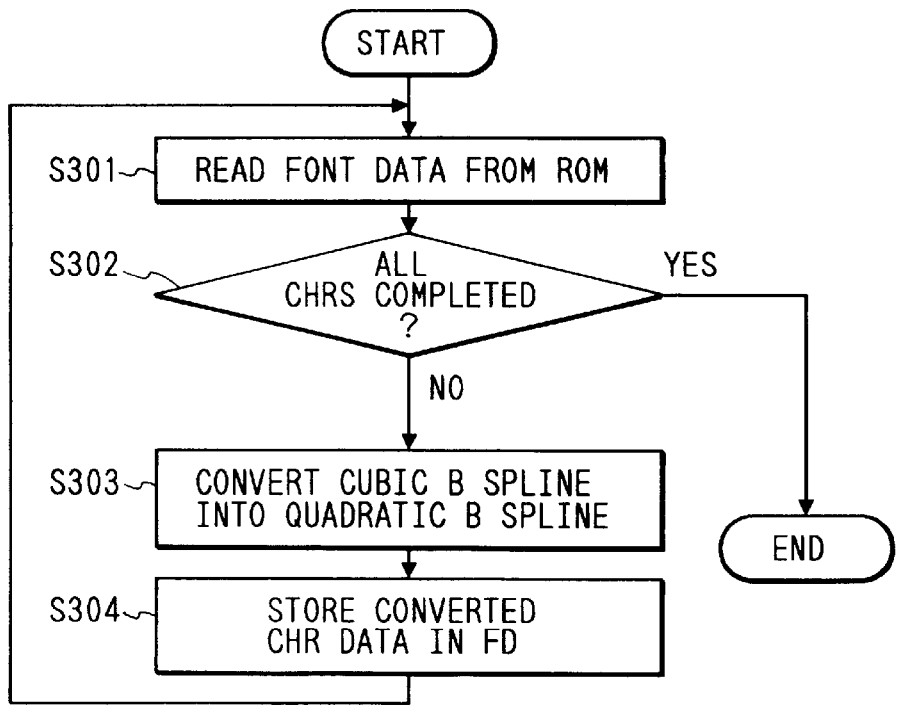
FIG. 9 is a flowchart for Embodiment 3.

FIG. 9 is a flowchart showing the operation of the present invention. At step S301, font data is read from the ROM 13. At step S302, a check is performed to determine whether or not all the character data have been processed. When all the data have been processed, the program is terminated. At step S303, the straight line portion is retained in the same state, while a cubic B spline curve is converted into a quadratic B spline curve, and character data are re-made into character data that consist of quadratic B spline curves and straight lines. Since the method for converting a cubic B spline curve into quadratic B spline curves has previously been described, an explanation for it will not be given here. At step S304, the acquired character data are stored on the floppy disk 15. Program control returns to step S301 to perform the processing for the next character data.

As is described above, the outline font data that consist of cubic B spline curves and straight lines are converted into outline font data that consist of quadratic B spline curves and straight lines, so that conversion into various font format is available, and format conversion of font data can be easily and exactly performed. The character data that are stored on the floppy disk are printed or displayed by storing the data in the ROM of a printer or a display device, or by downloading the data to the RAM of the printer or the display device.

As is described above, since a quadratic curve is generated directly by employing the coordinates of the control points of a cubic curve, such as a cubic Bezier curve or a cubic B spline curve, the following effects are obtained:

1. Since no human effort is required, it is possible to convert the data for a curve at a low cost.
2. Since mathematical conversion is performed, accuracy can be maintained.
3. An approximate accuracy can be easily changed to confirm the accuracy required.
4. The process can be performed for various things that are represented by curves, such as figures and characters.

What is claimed is:

1. A data conversion apparatus comprising:

input means for inputting four points representing a third order Bezier curve, comprising a first end point P0, a first intermediate point P1, a second intermediate point P2, and a second end point P3;

calculation means for determining a middle point PA of a line segment that links points P0 and P1, a middle point Pβ of a line segment that links points P1 and P2, a middle point PD of a line segment that links middle points PA and PB, a middle point PC of a line segment that links points P2 and P3, a middle point PE of a line segment that links middle points Pβ and PC, and for calculating a point at which a line that links middle points PD and PE and a line that links points P0 and P1 cross over each other as an intermediate point Pβ of a second order spline curve;

first discrimination means for discriminating whether Pβ exists at a position adjacent to a point that divides, at a ratio of 3:1, the line that links points P0 and P1;

registration means for registering points P0, Pβ and PF if said first discrimination means discriminates that point Pβ exists at that position, said registration means registering points P0, Pβ, and PF, respectively, as a first end point, and intermediate point, and a second end point of the second order spline curve; and execution means for dividing the third order Bezier curve and for causing said calculation means and said first discrimination means to perform a calculation process and a discrimination process based on the divided Bezier curve if said first discrimination means discriminates that point PS does not exist at that position.

2. An apparatus according to claim 1, further comprising second discrimination means for discriminating whether the line segment that links points P1 and P2 has a ratio of approximately 1:3 in length to the line segment that links points P0 and P3, wherein said-registration means registers points P0, Pβ and PF if said first discrimination means discriminates that point Pβ exists at that position and if said second discrimination means discriminates that the two line segments have the 3:1 ratio.

3. An apparatus according to claim 1, further comprising third discrimination means for discriminating whether a line that links points P0 and P1 and a line that links points P3 and P2 form an angle equal to or larger than 140°, wherein said registration means registers points P0, Pβ and PF if said third discrimination means discriminates that the two lines form that angle.

4. An apparatus according to claim 3, wherein said third discrimination means performs a discrimination process if said first discrimination means discriminates that point Pβ does not exist at that position.

5. An apparatus according to claim 3, wherein said execution means divides the third order Bezier curve and causes said calculation means and said first discrimination means to perform a calculation process and a discrimination process based on the divided Bezier curve if said third discrimination means discriminates that the two lines form an angle less than 140°.

6. An apparatus according to claim 1, further comprising conversion means for converting data of a third order spline curve into data of the third order Bezier curve.

7. A data conversion method comprising the steps of:

an input step for inputting four points representing a third order Bezier curve, comprising a first end point P0, a first intermediate point P1, a second intermediate point P2, and a second end point P3;

a calculation step for determining a middle point PA of a line segment that links points P0 and P1, a middle point PB of a line segment that links points P1 and P2, a middle point PD of a line segment that links middle points PA and PB, a middle point PC of a line segment that links points P2 and P3, a middle point PE of a line segment that links middle points PB and PC, and for calculating a point at which a line that links middle points PD and PE and a line that links points P0 and P1 cross over each other as an intermediate point P1 of a second order spline curve;

a first discrimination step for discriminating whether Pβ exists at a position adjacent to a point that divides, at a ratio of 3:1, the line that links points P0 and P1;

a registration step for registering points P0, Pβ and PF if said first discrimination step discriminates that point Pβ exists at that position, said registration means registering points P0, Pβ, and PF, respectively, as a first end point, and intermediate point, and a second end point of the second order saline curve; and an execution step for dividing the third order Bezier curve and for causing said calculation step and said first discrimination step to perform a calculation process and a discrimination process based on the divided Bezier curve if said first discrimination step discriminates that point Pβ does not exist at that position.

8. A method according to claim 7, further comprising second discrimination step for discriminating whether the line segment that links points P1 and P2 has a ratio of approximately 1:3 in length to the line segment that links points P0 and P3, wherein said registration step registers points P0, Pβ and PF if said first discrimination step discriminates that point Pβ exists at that position and if said second discrimination step discriminates that the two line segments have the 3:1 ratio.

9. A method according to claim 7, further comprising third discrimination step for discriminating whether a line that links points P0 and P1 and a line that links points P3 and P2 form an angle equal to or larger than 140°, wherein said registration step registers points P0, Pβ and PF if said third discrimination step discriminates that the two lines form that angle.

10. An apparatus according to claim 9, wherein said third discrimination step performs a discrimination process if said first discrimination step discriminates that point Pβ does not exist at that position.

11. A method according to claim 9, wherein said execution step divides the third order Bezier curve and causes said calculation step and said first discrimination step to perform a calculation process and a discrimination process based on the divided Bezier curve if said third discrimination step discriminates that the two lines form an angle less than 140°.

12. An apparatus according to claim 7, further comprising conversion means for converting data of a third order spline curve into data of the third order Bezier curve.

13. A storage medium storing a data conversion program executable by a computer to carry out the following steps comprising:

an input step for inputting four points representing a third order Bezier curve, comprising a first end point P0, a first intermediate point P1, a second intermediate point P2, and a second end point P3;

a calculation step for determining a middle point PA of a line segment that links points P0 and P1, a middle point PB of a line segment that links points P1 and P2, a middle point PD of a line segment that links middle points PA and PB, a middle point PC of a line segment that links points P2 and P3, a middle point PE of a line segment that links middle points PB and PC, and for calculating a point at which a line that links middle points PD and PE and a line that links points P0 and P1 cross over each other as an intermediate point Pβ of a second order spline curve;

a discrimination step for discriminating whether Pβ exists at a position adjacent to a point that divides, at a ratio of 3:1, the line that links points P0 and P1;

a registration step for registering points P0, Pβ and PF if said first discrimination means discriminates that point Pβ exists at that position, said registration means registering points P0, Pβ, and PF, respectively, as a first end point, and intermediate point, and a second end point of the second order spline curve; and an execution step for dividing the third order Bezier curve and for causing said calculation means and said first discrimination means to perform a calculation process and a discrimination process based on the divided Bezier curve if said first discrimination step discriminates that point Pβ does not exist at that position.

* * * * *

UNITED STATES PATENT AND TRADEMARK OFFICE
CERTIFICATE OF CORRECTION

PATENT NO. : 5,818,459

DATED : October 6, 1998

INVENTOR(S) : TSUNEAKI KURUMIDA

It is certified that error appears in the above-identified patent and that said Letters Patent is hereby corrected as shown below:

On the title page,

Item [56] OTHER PUBLICATIONS:

"Compter" should read "Computer--.

COLUMN 1:

Line 12, "Backgound" should read --Background--.

COLUMN 2:

Line 47, "curve;" should read --curve; and--; and
Line 62, "RAM 4" should read --RAM--.

COLUMN 3:

Line 13, "Q2," should read --Q2--.

COLUMN 10:

Line 14, "P$\beta$" should read --PB--;
Line 18, "P$\beta$" should read --PB--;
Line 37, PS" should read --P$\beta$--; and
Line 42, "said-registration" should read --said registration--.

UNITED STATES PATENT AND TRADEMARK OFFICE
CERTIFICATE OF CORRECTION

PATENT NO. : 5,818,459

DATED : October 6, 1998

INVENTOR(S) : TSUNEAKI KURUMIDA

It is certified that error appears in the above-identified patent and that said Letters Patent is hereby corrected as shown below:

<u>COLUMN 11</u>:

Line 15, "P1" should read --P$\beta$--; and
Line 25, "saline" should read --spline--.

Signed and Sealed this

Twenty-seventh Day of July, 1999

Attest:

Q. TODD DICKINSON

*Attesting Officer*    *Acting Commissioner of Patents and Trademarks*